United States Patent [19]
Grasso

[11] B 3,982,961
[45] Sept. 28, 1976

[54] FUEL CELL STACK WITH AN INTEGRAL EJECTOR FOR REACTANT GAS RECIRCULATION

[75] Inventor: Albert P. Grasso, Vernon, Conn.

[73] Assignee: United Technologies Corporation, Hartford, Conn.

[22] Filed: May 2, 1975

[21] Appl. No.: 574,128

[44] Published under the second Trial Voluntary Protest Program on February 17, 1976 as document No. B 574,128.

[52] U.S. Cl. ................................................. 429/34
[51] Int. Cl.² ...................................... H01M 8/06
[58] Field of Search ............... 136/86 R, 86 B, 86 C

[56] References Cited
UNITED STATES PATENTS

| | | | |
|---|---|---|---|
| 3,379,572 | 4/1968 | Gay | 136/86 B |
| 3,542,598 | 11/1970 | White et al. | 136/100 R |

Primary Examiner—G. L. Kaplan
Assistant Examiner—H. A. Feeley
Attorney, Agent, or Firm—Stephen E. Revis

[57] ABSTRACT

A stack of fuel cells operating on gaseous reactants includes an ejector in integral heat exchange relationship with the stack for recirculating one of the reactant gases through the cells of the stack. The recirculating reactant is continuously heated by waste heat from the cells as it recirculates thereby preventing condensation of water from the recirculating reactant gas and thereby maintaining the dew point constant from the time the reactant gas leaves the cells until it is mixed with fresh reactant in the ejector. The fresh reactant gas is preheated prior to being introduced to the ejector so that there is no condensation throughout the entire loop. The recirculation rate relative to the amount of fresh reactant can be controlled to regulate the dew point at the entrance to the cells to best advantage. By this invention flooding of the electrodes or drying of the electrodes does not occur.

12 Claims, 7 Drawing Figures

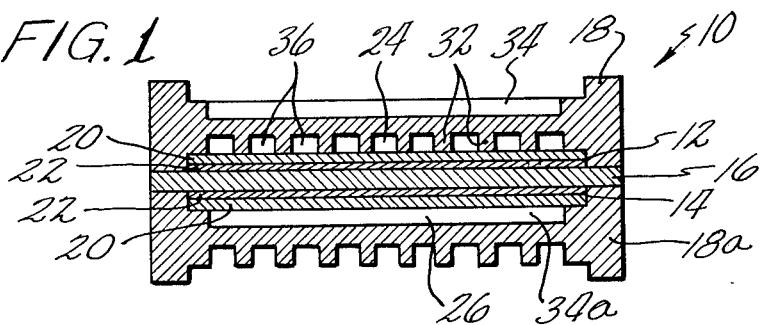
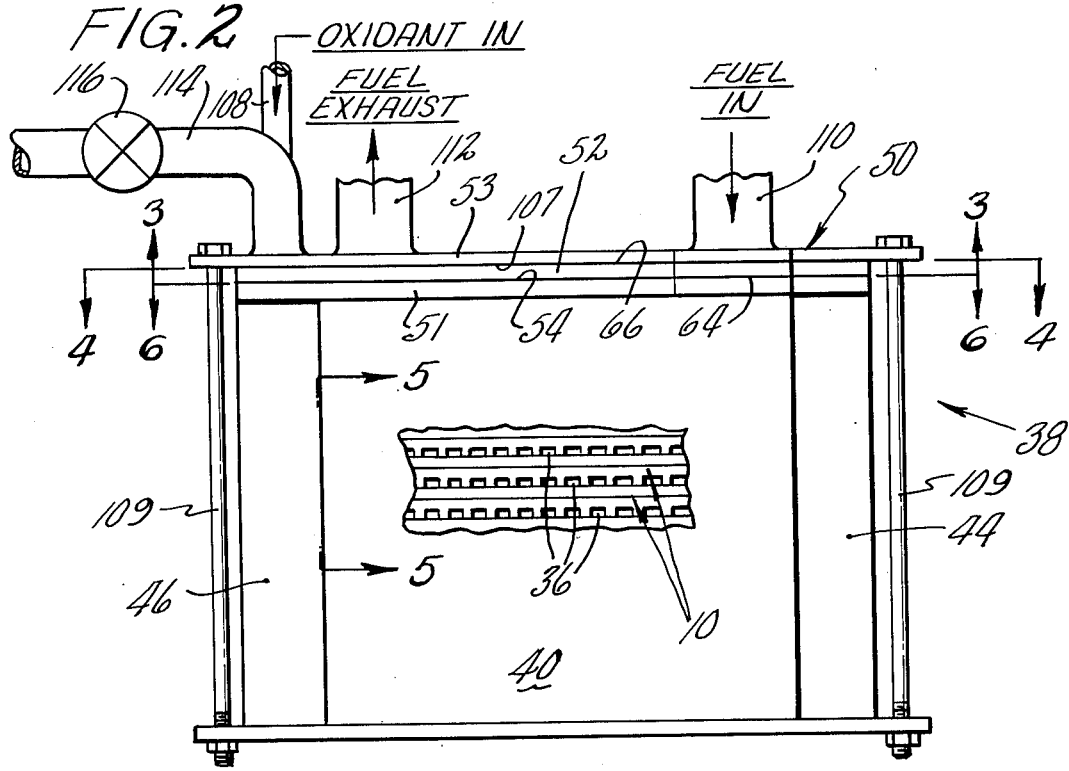
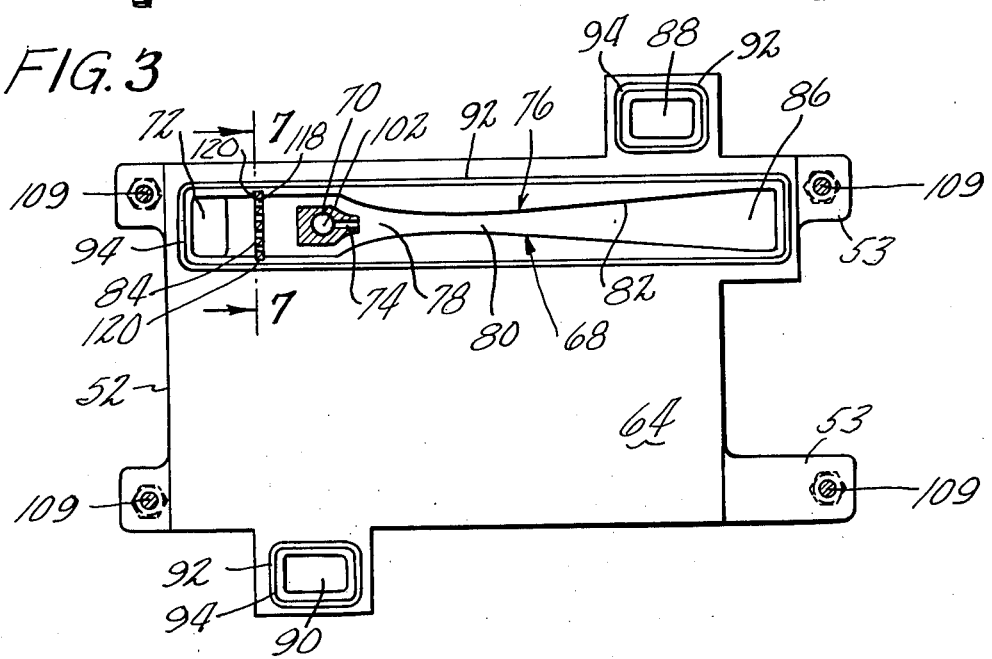

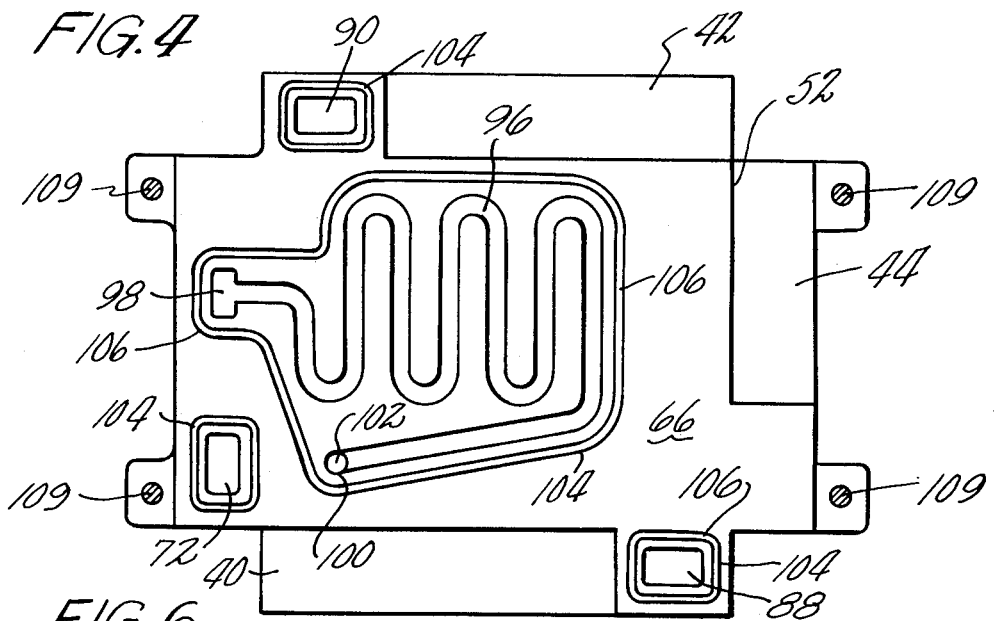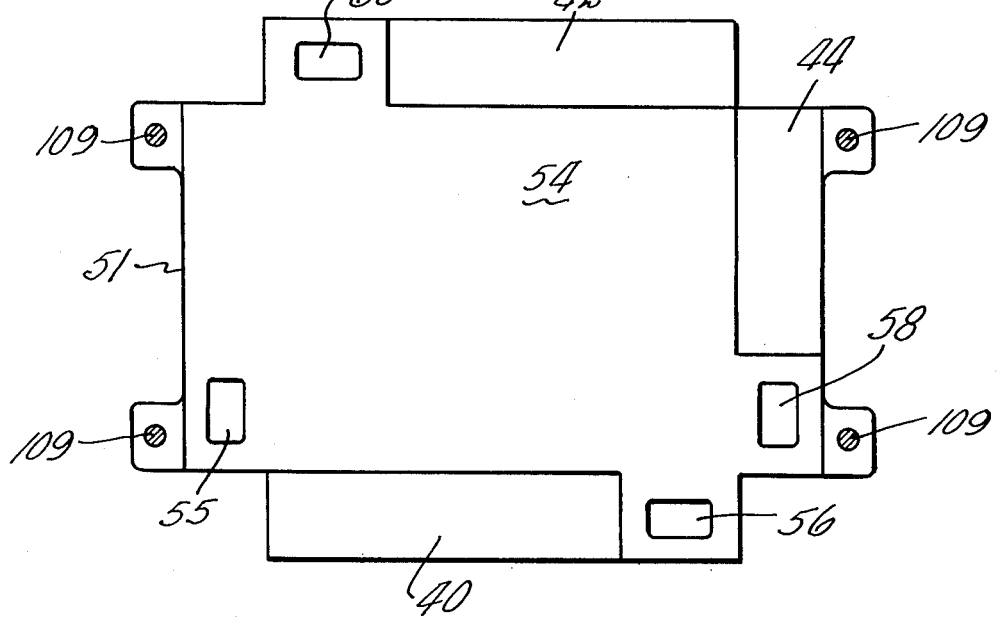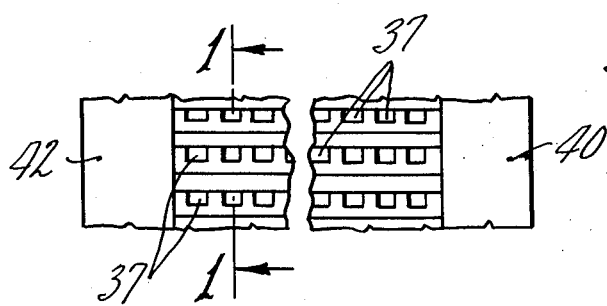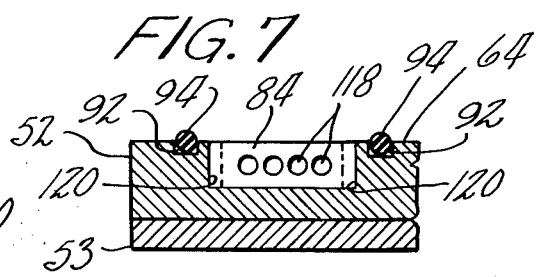

FUEL CELL STACK WITH AN INTEGRAL EJECTOR FOR REACTANT GAS RECIRCULATION

BACKGROUND OF THE INVENTION

1. Field of the Invention

This invention relates to fuel cells and more particularly to apparatus for recirculating a reactant gas within a fuel cell stack.

2. Description of the Prior Art

A basic fuel cell comprises an anode electrode spaced apart from a cathode electrode with an electrolyte disposed therebetween in a compartment formed between the two electrodes. On the nonelectrolyte side of the anode electrode is a reactant gas chamber for carrying a fuel into contact with the anode electrode. On the nonelectrolyte side of the cathode electrode is a reactant gas chamber for carrying an oxidant into contact with the cathode electrode.

One of the reaction products of a fuel cell is water. The reactant gases passing through the cells of a stack have the job of carrying excess water from the cell stack. In a cell using a base electrolyte and 100 percent oxygen as the oxidant (as opposed to air), the oxidant gas chamber is often dead ended. In other words, oxygen is fed into the cell stack but does not leave except for occasional purging necessary to get rid of the slow accumulation of impurities which come in with the oxygen. On the other hand, it is typical that the fuel reactant gas chambers are not dead ended. The fuel travels through the cells, picking up excess water as it passes therethrough, and is recirculated (in part) through the fuel reactant gas chamber by a pump after passing through a condenser and separator to remove excess water therefrom. Fresh fuel is, of course, added to the recirculated, partially vitiated fuel in sufficient quantities to operate the stack.

As fuel cells are pushed to higher and higher power levels a problem may occur at the inlets to both the fuel and oxidant gas chambers. That is, as more and more quantities of new, dry reactant gases come into the cells they produce a local drying of the cells near the inlets of the reactant gas chambers. This is normally not a problem on the fuel side since the recirculating fuel contains a fair amount of moisture. However, dry out of the electrodes on the oxygen side, with no recirculation, is a potential problem. Even with a recirculating oxidant system, if the gas drops below the dew point before it reaches the inlet to the cells either of two things could happen: (1) water could condense from the recirculating oxidant resulting in its being too dry as it enters the cells, which would thereby defeat one of the purposes for recirculating the oxidant in the first place, or (2) the water condensing from the recirculating oxidant could be dragged back into the inlet of the cell and produce localized discontinuities in the concentration of the electrolyte (i.e., flooding), which is also detrimental to the cell.

According to the prior art an external pump should be used to recirculate the gas; and, in order to have the dew point of the recirculating oxidant at precisely that desired for proper operation of the cell, a condenser with a temperature control is required. The condenser, of course, also requires a recirculating cooling system and a heat rejection radiator. It is thus apparent that prior art approaches to recirculating a reactant gas stream are unattractive from both a complexity point of view and a cost point of view.

SUMMARY OF THE INVENTION

One object of the present invention is an improved fuel cell stack with a recirculating reactant gas.

Another object of the present invention is recirculation of a reactant gas with little or no variation in the dew point of the recirculating gas stream.

A further object of the present invention is a recirculating reactant gas system for a fuel cell stack which is both cost effective and uncomplicated.

Accordingly, a fuel cell stack is provided with an ejector in integral heat exchange relationship with the cells thereof for providing the pumping action to recirculate a reactant gas through the stack. Fresh reactant is the primary fluid for the ejector and is preheated prior to entering the ejector. By this invention recirculation of the reactant is maintained at a temperature high enough so that there is no condensation and therefore no variation in the dew point of the recirculating portion of the reactant stream prior to mixing with the fresh reactant gas.

Initial attempts were made to use an external (i.e., non-integral) oxygen ejector system with no separator or condenser. Many unsuccessful attempts were made to insulate the system from heat loss in order to prevent condensation of the recirculating oxidant. Electrical heaters were even used to maintain the ejector temperature and to heat the gases before they entered the cells. However, the recirculating stream always dropped below the dew point and liquid water would condense out of the stream. Because there was no place for the water to go it continued to migrate with the recirculating gas back around to the inlet of the oxidant gas chambers resulting in flooding the cells. The normal reheating of the gas by the fuel cell stack as it flowed through the cells eventually boiled the condensed water back into the stream; however, not only did this take time, but variations in the concentration of the water (i.e., stream dew point) occurred such that the inlet concentration of the cell stack fluctuated.

In a preferred embodiment of the present invention the oxygen is recirculated by an ejector built into the end plate of a cell stack and in heat exchange relationship with the cells in the stack. The primary fluid for the ejector is the fresh oxidant for the stack. This fresh oxidant is preheated, prior to entering the ejector, to a temperature high enough so that it does not fall below the dew point temperature as it passes through the ejector. In this manner, both the fresh oxidant and the recirculated oxidant entering the cells is maintained above the dew point such that no condensation occurs. The actual dew point of the gases entering the cells may be controlled by the ratio of recirculated gas to fresh oxidant fed into the ejector.

Other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a sectional view, not to scale, taken along the line 1—1 of FIG. 5, of a fuel cell assembly used in the stack of FIG. 2.

FIG. 2 is an elevational view, partly broken away, showing a fuel cell stack according to the present invention.

FIG. 3 is a sectional view taken along the line 3—3 of FIG. 2.

FIG. 4 is a sectional view taken along the line 4—4 of FIG. 2.

FIG. 5 is a sectional view taken along the line 5—5 of FIG. 2.

FIG. 6 is a sectional view taken along the line 6—6 of FIG. 2.

FIG. 7 is a sectional view taken along the line 7—7 of FIG. 3.

DESCRIPTION OF THE PREFERRED EMBODIMENTS

Referring first to FIG. 1, a fuel cell assembly 10 is shown comprising an anode electrode 12, a cathode electrode 14, an electrolyte retaining matrix 16, and a separator/support plate 18. Each electrode 12, 14 includes a substrate 20 having a catalyst layer 22 disposed on the surface thereof facing the matrix 16 which separate the two electrodes. The separator plate 18 of the assembly 10 and separator plate 18a of the next adjacent assembly define, in combination with the electrodes 20, reactant gas chambers 24, 26. Also in this embodiment, the plates 18 include ribs 32, 34 which provide support for the electrodes 20. The ribs 32 within the chamber 24 are perpendicular to the ribs 34a in the chamber 26 and define channels 36. The ribs 32a define channels 37 (see FIG. 5). In this embodiment the electrolyte is potassium hydroxide, the matrix 16 is asbestos, the substrate 20 is a nickel screen, the catalyst layer 22 is Teflon bonded platinum, and the separator plates 18 are nickel. These materials are by way of example only and the present invention is not intended to be limited thereto.

Referring now to FIG. 2, a cell stack 38 is shown comprising a plurality of cell assemblies 10 connected electrically in series. The stack 38 also includes a fuel inlet manifold 40 on one side thereof, a fuel outlet manifold 42 (see FIG. 4) on the opposite side thereof, an oxidant inlet manifold 44 on one end thereof, and an oxidant outlet manifold 46 on the other end thereof. The channels 36 of the cell assembly 10 extend from one side of the cell to the other and open into the fuel manifolds 40, 42. Likewise, the channels 37 formed by the ribs 34 extend from one end of the cell assemblies 10 to the other and open into the oxidant manifolds 44, 46. These channels are best shown in FIG. 5.

Still referring to FIG. 2, the stack 38 includes an end plate assembly 50 comprising a bottom plate 51, a central plate 52, and a top plate 53. The bottom plate 51 is similar, in a sense, to one of the separator plates 18 except it has ribs on only one side thereof to support the electrode in the last cell assembly 10 of the stack 38. The surface of the bottom plate 51 opposite to the ribbed surface is designated by the numeral 54 and is a flat surface best shown in FIG. 6. The bottom plate 51 includes openings 55, 56, 58, and 60 therethrough which lead to the manifolds 46, 40, 44, and 42, respectively.

The central plate 52 is disposed atop of the bottom plate 51 and is hereinafter referred to as the ejector plate 52. The ejector plate 52 comprises a bottom surface 64 and a top surface 66. The bottom surface 64 mates with the surface 54 of the bottom plate 51.

The surface 64 of the plate 52 is best shown in FIG. 3. An ejector 68 is machined into the surface 64 and comprises a primary inlet 70, a secondary inlet 72, a primary nozzle 74, and a pressure recovery section 76.

The pressure recovery section 76 includes a mixing area 78, a long mixing tube portion 80 and a diffuser section 82. The ejector 68 also includes a restrictor plate 84. The exit end 86 of the diffuser section 82 communicates with the manifold 44 via the opening 58 in the bottom plate 51. The inlet 72 communicates with the manifold 46 through the opening 55 in the bottom plate 51. The plate 52 also includes openings 88, 90 therethrough which communicate with the fuel manifolds 40, 42, respectively, via the openings 56, 60, respectively, through the bottom plate 51. Grooves 92 surround the ejector 68 and each of the openings 88, 90 and accommodate rubber O-rings or gaskets 94 for the purpose of preventing leakage from between the plates 51, 52. The groove 92 surrounding the ejector 68 and its corresponding gasket 94 is shown in cross section in FIG. 7.

The top surface 66 of the ejector plate 52 is best shown in FIG. 4. An oxidant carrying conduit 96 is machined into the surface 66. Conduit 96 includes an oxidant entrance 98 at one end thereof. The other end terminates at an opening 100 which is the entrance to a hole 102 passing through the plate 52. The hole 102 terminates within the ejector 68 and is the primary inlet 70 therefor as best shown in FIG. 3. The grooves 104 in the surface 66 surround the conduit 96 and each of the openings 72, 88, 90 and have O-rings or gaskets 106 disposed therein for sealing against the top plate 53.

Referring once again to FIG. 2, the top plate 53 has a flat bottom surface 107 which mates flush with the surface 66 of the ejector plate 52 thereby forming a wall of the conduit 96. A suitable number of tie rods 109 are disposed around the periphery of the stack 38 to hold the stack together and maintain compression between the plates 51, 52, 53 to effectuate sealing. The plate 53 has openings therethrough (not shown) corresponding to the openings 72, 88 and 90 through the plate 52. The top plate 53 also includes an opening therethrough (not shown) communicating with the entrance 98 to the conduit 96; a conduit 108 communicates with the last mentioned opening in the top plate 53 for carrying an oxidant into the conduit 96; a conduit 110 communicates with the opening in the top plate 53 corresponding to the opening 88 through the ejector plate 52 for carrying fuel into the manifold 40; a conduit 112 communicates with the opening in the top plate 53 corresponding to the opening 90 through the ejector plate 52 for carrying exhausted fuel from the manifold 42 away from the stack 38; and another conduit 114 communicates with the manifold 46 via the opening in the top plate 53 corresponding to the opening 72 through the ejector plate 52. The last mentioned conduit 114 leads to a purge valve 116 the normal position of which is closed such that the oxidant cannot leave the stack 38. Occasionally the valve 116 is opened to purge the oxidant recirculation system of impurities which accumulate slowly over a period of time.

In operation, oxygen is fed to the entrance 98 of the conduit 96 via the conduit 108. As it travels the path of the conduit 96 it is heated by waste heat from the cell assemblies 10 of the stack 38. The preheated oxygen leaves the conduit 96 via the opening 102 and enters the primary inlet 70 of the ejector 68. The oxygen passes through the primary nozzle 74 and is discharged into the mixing area 78, thereby producing a low pressure immediately downstream of the primary nozzle 74. The oxygen is thereby drawn from the manifold 46, into the ejector secondary inlet 72, through the restrictor plate 84, around the primary nozzle 74, into the mixing area 78, and through the mixing tube 80. The combined gases emerge from the mixing tube 80 at a pressure higher than the pressure in the inlet manifold 46, pass through the diffuser section 82 whereupon the pressure continues to increase. Because the ejector 68 is integral with the stack 38 and in heat exchange relationship with the cell assemblies 10 of the stack 38 the gases are maintained at approximately the operating temperature of the stack. The mixture of fresh and recirculated oxygen leaves the ejector 68 at the end 86 of the diffuser section 82 and enters the manifold 44 via the opening 58 through the bottom plate 51. These gases then pass through the cell assemblies 10 via the oxidant gas chambers 26 and exhaust into the manifold 46 to complete the cycle.

The restrictor plate 84 is best shown in FIG. 7 and has a plurality of openings 118 therethrough. The total area of the openings 118 controls the recirculation rate and is chosen so as to maintain the dew point of the gases within the manifold 44 at a level compatible with the water removal rate from the cell on the hydrogen side of each cell assembly 10 in order to achieve, as close as possible, a constant electrolyte concentration through the cell. By having the ejector integral with the stack and in heat exchange relationship with the cells the temperature of the gases entering the cells is always maintained higher than the dew point because the cells operate at a temperature higher than the dew point. In this embodiment the restrictor plate 84 is a separate element which fits into grooves 120 in the ejector plate 52. This is for the purpose of being able to remove the plate 84 to modify the open area of the holes 118 therethrough in order to achieve the appropriate recirculation rate for best operation of the cell. In one stack constructed according to the present embodiment the recirculation rate giving best results was six parts of recirculated oxygen to ten parts of fresh oxygen. Once the best open area of the restrictor plate 84 is known future stacks can be built without the plate 84 by simply designing the ejector such that the area of the secondary inlet 72 is the same as the open area of the restrictor plate 84.

In this preferred embodiment the invention is directed to recirculating the oxidant, but it should be apparent that the invention may well be applicable, in certain situations, to recirculating hydrogen instead of or in addition to recirculating the oxidant, and such is contemplated to be within the scope of the present invention. Also, in this preferred embodiment the fresh oxidant is preheated using waste heat from the stack 38, but the oxidant could be preheated by other means, such as by an electric heater. This, too, is contemplated as being within the scope of the present invention.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by letters Patent of the United States is:

1. In a fuel cell stack comprising a plurality of fuel cells each including a fuel electrode and an oxidant electrode spaced apart defining an electrolyte compartment therebetween, means constructed and arranged with said cells to define a reactant gas space on the nonelectrolyte side of each electrode, said reactant gas spaces including a fuel gas space on the nonelectrolyte side of each fuel electrode and an oxidant gas space on the nonelectrolyte side of each oxidant electrode, each of said gas spaces having an inlet and an outlet, the improvement to said stack comprising:
   an ejector for delivering and recirculating one of said reactant gases through said cells, said ejector constructed and arranged to be integral with and in heat exchange relationship with the cells of said stack, said ejector including primary inlet means, secondary inlet means, and outlet means;
   first conduit means connected to said ejector primary inlet means for delivering preheated reactant gas into said ejector primary inlet means;
   second conduit means connecting said ejector outlet means to said inlets of said recirculating reactant gas spaces; and
   third conduit means connecting said recirculating reactant gas space outlets with said ejector secondary inlet means, said secondary inlet means including means for establishing the recirculation rate of reactant gas through said ejector.

2. The improvement to said stack according to claim 1 wherein said recirculating reactant gas is the oxidant.

3. The improvement to said stack according to claim 1 wherein said first conduit means is in heat exchange relationship with the cells in said stack for preheating the reactant gas using stack waste heat prior to its delivery into said ejector.

4. The improvement to said stack according to claim 1 wherein said stack includes end plate means adjacent the last cell of said stack and in heat exchange relationship therewith, said ejector being an integral part of said end plate means.

5. The improvement to said stack according to claim 4 wherein said first conduit means is an integral part of said end plate means for preheating said reactant gas using stack waste heat prior to its delivery into said ejector.

6. In a fuel cell stack comprising a plurality of fuel cells each including a fuel electrode and an oxidant electrode spaced apart defining an electrolyte compartment therebetween, means constructed and arranged with said cells to define a fuel gas space on the nonelectrolyte side of each fuel electrode and an oxidant gas space on the nonelectrolyte side of each oxidant electrode, each of said oxidant gas spaces having an inlet and an outlet, the improvement to said stack comprising:
   an ejector for delivering and recirculating an oxidant through said cells, said ejector constructed and arranged to be integral with and in heat exchange relationship with said stack, said ejector including primary inlet means, secondary inlet means, and outlet means;
   first conduit means connected to said ejector primary inlet means for delivering fresh oxidant into said ejector, said first conduit means being in heat exchange relationship with the cells of said stack for preheating the oxidant using stack waste heat prior to its delivery into said ejector;
   second conduit means connecting said ejector outlet means to said oxidant gas space inlets; and
   third conduit means connecting said oxidant gas space outlets to said ejector secondary inlet means, said secondary inlet means including means for establishing the recirculation rate of oxidant through said ejector.

7. The improvement to said stack according to claim 6 wherein said fuel cell stack includes plate means disposed adjacent to and in heat exchange relationship with one of the cells of said stack, said ejector being disposed within said plate means.

8. The improvement to said stack according to claim 7 wherein said third conduit means is disposed within said plate means.

9. The improvement to said stack according to claim 8 wherein said plate means is disposed adjacent the last cell of said stack.

10. In a fuel cell stack comprising a plurality of fuel cells connected electrically in series, each cell including a fuel cell electrode and an oxidant electrode spaced apart defining an electrolyte compartment therebetween, means constructed and arranged with said cells to define a fuel gas space on the nonelectrolyte side of each fuel electrode and an oxidant gas space on the nonelectrolyte side of each oxidant electrode, each of said oxidant gas spaces having an inlet and an outlet, said stack also including oxidant outlet manifold means in communication with said oxidant gas space outlets and oxidant inlet manifold means in communication with said oxidant gas space inlets, and plate means disposed adjacent the last cell of said stack and in heat exchange relationship therewith, the improvement to said stack comprising:

said plate means including an ejector disposed therein for delivering and recirculating an oxidant through said cells, said ejector including outlet means in communication with said oxidant inlet manifold means, secondary inlet means in communication with said oxidant outlet manifold means, and primary inlet means for receiving fresh, preheated oxidant into said ejector, said secondary inlet means including means for establishing the recirculation rate of oxidant through said ejector.

11. The improvement to said stack according to claim 10 wherein said plate means includes conduit means disposed therein and connected to said ejector primary inlet means for delivering preheated oxidant to said ejector.

12. The improvement to said stack according to claim 10, said plate means including a central plate having a top surface and a bottom surface, said bottom surface having ejector passageways formed therein, said ejector passageways including a primary nozzle, said top surface including a groove, said plate means including a bottom plate having a flat surface mating with the bottom surface of said central plate forming a wall of said ejector passageways thereby defining said ejector, said plate means including a top plate having a flat surface mating with the top surface of said central plate and forming a wall of said groove thereby defining a conduit, said conduit having an entrance end and an exit end, said central plate including an opening therethrough connecting said primary nozzle and said exit end for providing fluid communication therebetween, said entrance end adapted to communicate with a supply of oxidant.

* * * * *